C. Wahl.
Drying Glue.
Nº 80,250. Patented Jan. 21, 1868.
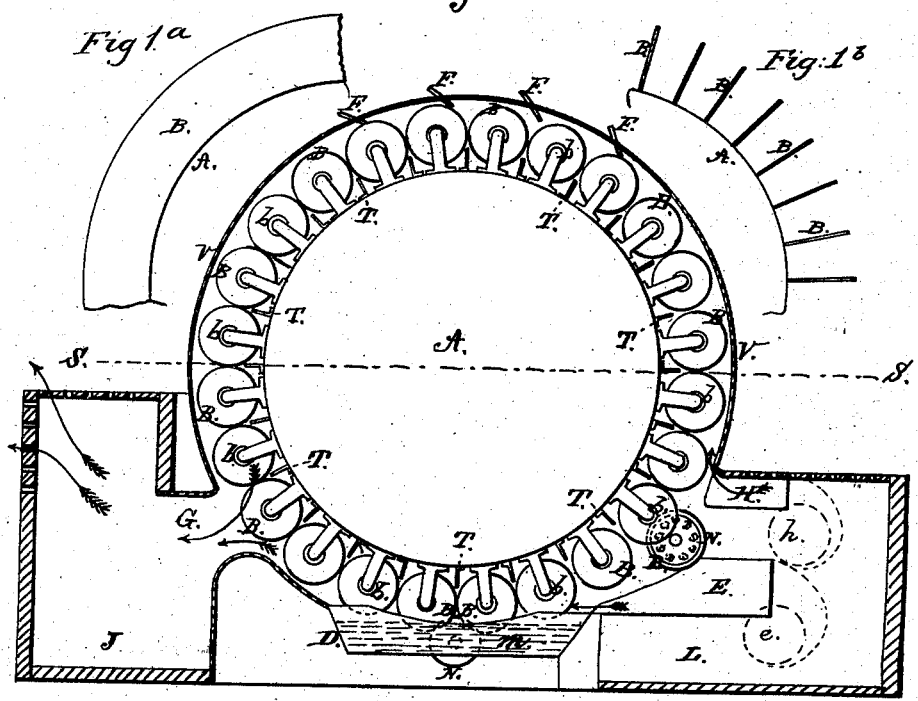
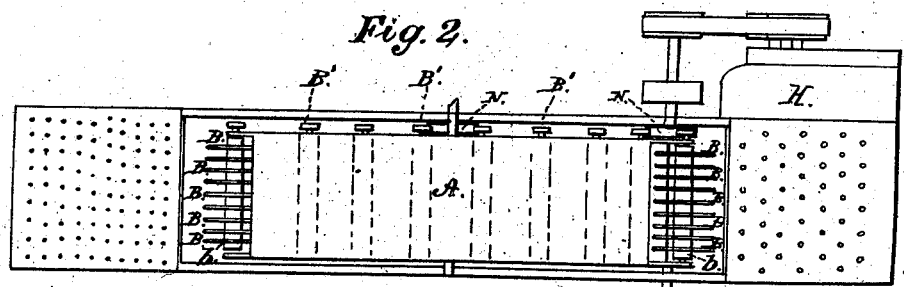
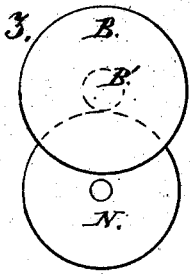
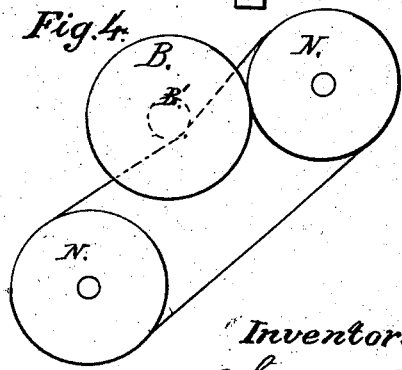
Witnesses
Wm C. Dey.
Thomas D. Stetson
Inventor:
Christian Wahl

United States Patent Office.

CHRISTIAN WAHL, OF CHICAGO, ILLINOIS.

*Letters Patent No. 80,250, dated July 21, 1868.*

IMPROVED MACHINE FOR DRYING GLUE.

The Schedule referred to in these Letters Patent and making part of the same.

TO ALL WHOM IT MAY CONCERN:

Be it known that I, CHRISTIAN WAHL, of Chicago, in the State of Illinois, have invented certain new and useful Improvements in Machines for Drying Glue; and I do hereby declare that the following is a full and exact description thereof.

My invention produces the finished glue in thin flakes of the best quality by a continuous operation, which may be effected very rapidly, and with little labor. Some portions of my apparatus have been before patented, but the features have not, so far as I am aware, been before combined, and several features of importance I believe to be entirely new.

I will first describe what I consider the best means of carrying out my invention, and will afterwards designate the points which I believe to be new therein.

Figure 1 is a side elevation of the entire apparatus with the side removed, to give a good view of the interior.

Figure 2 is a cross-section on the line *s s* in fig. 1.

Figure 3 represents some of the details on a large scale.

Figure 4 represents a modification of the same, which is on some accounts preferable.

Similar letters of reference indicate corresponding parts in all the figures.

A is a large wheel, slowly turned by means of a steam-engine, or other suitable power, not represented. On this wheel is carried a series of plates, B. The glue is dried in a thin coat on these plates, and cracks and comes off as the operation of drying becomes complete. The plates B are preferably of enamelled iron, or some material which presents an enamelled or polished surface.

D is the trough or vessel which contains the glue in a liquid condition.

The glue is maintained at a proper temperature therein by means of steam-pipes, or other approved means. The plates B, after being wet in the glue, *m*, are carried slowly around on the wheel, exposed to currents of air, which facilitate the drying. The air comes from two sources, and is very different in its condition and function.

*e* is a fan, which drives cold air through the passage E into contact with the plates B so soon as they emerge from the glue. This air being cold, chills the glue, and permits its setting in a uniform coating or thickness. This air escapes through the passage G without being carried in contact with the plates any great length of time. The fan *h* receives and blows into the apparatus, through the flue H, air which is either warmed or chemically dried, or both, in order to increase its drying effect. This air circulates in contact with the plates B, with the glue thereon, for a long period; that is to say, it rises on emerging from the flue H, and traverses more than half the entire circumference of the wheel A. It finally escapes through the flue G.

By this arrangement, the glue is exposed for a very short time to ordinary cold air until it is chilled. It is then exposed to air which is specially prepared to increase its drying effect for a large proportion of its revolutions.

The air, in escaping through the passage G, is liable to carry some of the flaky glue with it. The chamber J is provided to receive this glue, and the air, after depositing the flaky glue, escapes through wire gauze, or other finely-perforated medium, in the upper portion of the chamber J.

The plates B may be made in various forms, and arranged in various manners. I prefer to mount them in the form of disks, in series, on the shaft *b*, and to rotate them on their axes *b* while they are at the same time carried on the large wheel A; but this is not absolutely essential.

Figures 1 A 1 B represent modifications, which may be adopted if preferred.

Many other modifications may be made by any good mechanic without completely defeating the object of my invention, it being understood that the provisions for brushing off the glue, now to be described, should be very materially modified in case the other modifications of the drying-plates are adopted.

B' is a toothed wheel or pulley, much smaller in diameter than the disks B, and fixed on each shaft *b*. I esteem it well to rotate the shaft *b* and the parts carried thereon slowly through the entire journey, which may be effected by causing the wheel B' to traverse in fixed racks, which may be continued quite around, or interspersed at intervals; but I esteem it especially important that the rotation shall be active at two points. One of these points is while the plates are receiving the glue in the tank D, and the other is while they are being brushed by the rotating brush or rubber R.

It will be understood that the rubber R, which is preferably a brush, is made in disks, corresponding to the disks B, and matching between them, and that in rotating it rubs the disks and removes any of the flakes of glue which might tend to adhere to the plates. Now, by rotating the plates actively, while subjected to the action of the brush, I insure that all parts of the disks shall be treated by the rubber or brush, and ordinarily two or three times.

I effect this by causing the gear-wheel or pulley B' to come in contact at those points with corresponding gear-wheels or pulleys, N, which are rotated actively by the steam-engine or other motive-power which impels the apparatus. The action will now be readily understood. The plates B receive the glue in a liquid form uniformly, the glue is chilled thereon as soon as practicable afterwards, as soon as it is lifted from the tank D, then it is subsequently exposed for a long period to dry air, and turned slowly, either constantly or at intervals; but when it reaches the brush R, it is rotated very actively while it is being treated by the brush, and when it reaches the tank D it is again rotated.

It should not in this last instance rotate very rapidly, so as to seriously disturb the liquid, and cause it to splash upon any of the adjacent parts. It may be rotated when in contact with the brush as actively as the judgment or fancy of the constructor may prefer. By rotating the plates two or more times in the glue, chilling the same each time it is lifted, I get a just sufficiently thick and uniform coating of glue on the plates.

This adding the glue by successive coats, like dipping a candle in tallow, is especially important with some grades of glue. The greater contraction of a thick coating in drying facilitates its clearance from the plates I attach much importance to this repeated operation of dipping the plates into the glue, and chilling the same after each immersion, as in this manner I am able to obtain any desired thickness of the glue, and it is much easier to remove a comparatively heavier coating of glue from the plates than the very thinnest coatings, which are liable to cling to them.

It will be understood that a portion of the glue which is not blown out through the passage G is carried over with the wheel A, and dropped on the other side of the apparatus in a suitable chamber, L, as represented. I employ means for transferring over all the flakes of glue which fall off the plates B at or near the upper part of the circumference of the wheel. These means are the partial partitions T, which are arranged, as represented, between the series of disks B, and project out to a moderate extent, as represented. They perform two functions, one, the collecting and transferring over of the glue, as above intimated, the other, that of deflecting the current of air, which might otherwise tend to move around without proper circulation; that is to say, they stop or dam up the clear space which would otherwise be provided quite around next to the wheel A. These deflections or partial partitions T may be rigid.

I employ, in combination with the latter, and with all the other parts of the apparatus, another series of deflectors, which should be flexible, because they may and by preference should extend out so far as to touch the plates B. These are represented by F, and are fixed so as to extend inward from the casing V, which surrounds the wheel A, and which forms the channel in which the drying-air is conducted around. These have the effect to disturb and circulate the air, and to prevent its flowing too rapidly along the clear space outside of the plates B. By reason of the combination of both series of deflectors, F and T, with the other parts of my apparatus, I am enabled to insure a very efficient circulation of the currents of air.

Fig. 4 represents a modification of the provision for turning the plates B actively. This consists in the substitution of two pulleys, and a short elastic belt of pure vulcanized rubber, or analogous material, in place of the single pulley or gear-wheel N, above described. This allows the active rotation to be continued for a longer period than would otherwise be practicable, supposing the wheel A and its connections to be turned continuously, which is on some accounts preferable. But I can dispense with this device, fig. 4, and still turn the plates actively for any length of time desired, by arresting the motion of the wheel A and its connections at proper periods, so as to hold each series of plates B for a considerable period in contact with the impelling-means.

Figure 1ª represents plates extending around the wheel A, either continuously or intermittently. These may be brushed as above provided.

Figure 1ᵇ represents plates extending lengthwise of the wheel. These should be brushed by a special provision traversing lengthwise, as will be obvious, or the brushing may probably be dispensed with without entirely defeating the success of the apparatus.

Apparatus for pouring or squirting the liquid glue upon the surfaces B may be substituted for the tank D, if preferred.

Having now fully described my invention, what I claim as new, and desire to secure by Letters Patent, is as follows:

1. I claim the within-described combination and arrangement of the passages in a glue-drying apparatus, so that the glue-drying surfaces shall be presented to the warm or chemically-dried air for a longer period than to the cold air, for the purposes herein set forth.

2. I claim revolving the disks B, or their equivalents, two or more times when the glue is being received thereon, and chilling the glue at each revolution, substantially as and for the purposes herein set forth.

3. I claim actively revolving the disks B, by means of the pulleys N, or their equivalents, at the period when the glue is being removed, as herein specified.

4. I claim the partial partitions T, arranged as represented, and adapted to serve the double purposes of deflecting the air-currents and retaining the glue, substantially as herein set forth.

5. I claim the combination of the partial partitions F and T, arranged as represented relatively to each other and to the glue-exposing surfaces B, and to the currents of air traversing the same, substantially in the manner and for the purposes herein specified.

6. I claim the combination of the revolving disks B with the wheel A, for transporting them through drying currents of air, substantially as and for the purposes herein set forth.

In testimony whereof, I have hereunto set my name in presence of two subscribing witnesses.

CHRISTIAN WAHL.

Witnesses:
    C. C. LIVINGS,
    W. C. DEY.